INVENTOR.
WALTER W. WILLIAMS
BY Langdon Moore
ATTORNEY.

Patented July 7, 1936

2,046,667

UNITED STATES PATENT OFFICE 2,046,667

REFRIGERATING MECHANISM

Walter W. Williams, Bloomington, Ill.

Application June 28, 1934, Serial No. 732,778

3 Claims. (Cl. 62—115)

This invention relates to improvements in refrigerating mechanisms and more particularly to the removal of the lubricant employed in the mechanism of a compression type of refrigerating apparatus.

It is an object of this invention to prevent the lubricant necessary to the efficient operation of the compressor from being carried over with the compressed gaseous refrigerant into the evaporator.

With this and other objects in view, reference is made to the accompanying sheets of drawing which illustrate a preferred embodiment of this invention with the understanding that minor detail changes may be made without departing from the scope thereof.

In the drawings:

Figure 1 is a longitudinal, central, vertical, sectional view of a commercial compression type of refrigerating compressor, with parts shown in elevation, illustrating the application of this invention.

Figure 7:
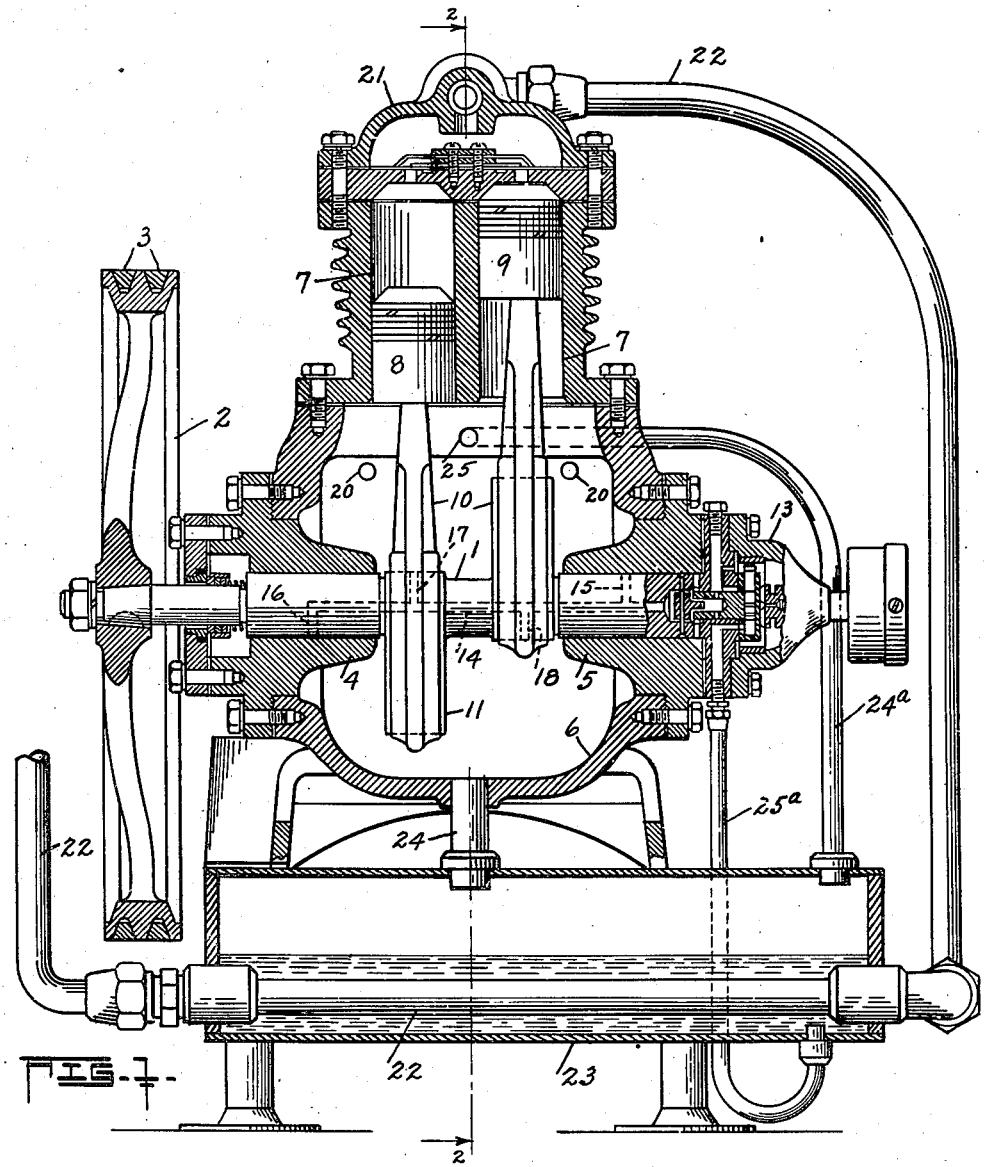
Figure 2:
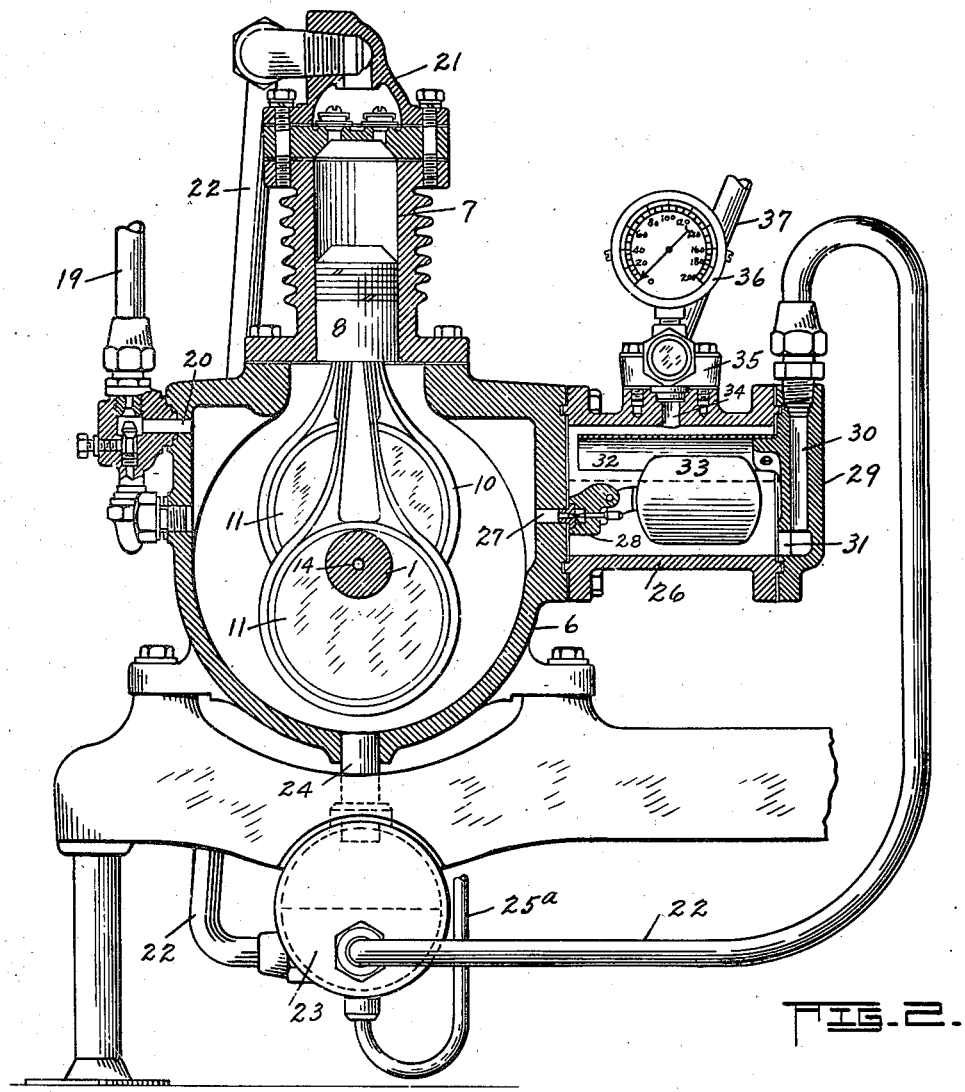
Figure 2 is a transverse central, vertical section taken on the line 2—2, Figure 1, looking in the direction of the arrows, with parts shown in elevation.

The type of compressor illustrated includes a crank shaft 1 driven by a pulley 2 connected by belts 3 to any convenient source of power, not shown. The shaft 1 is mounted to rotate in the bearings 4 and 5 mounted in a crank case 6. The compression cylinders 7 are mounted upon the upper side of the crank case, and pistons 8 and 9 are reciprocated therein in the usual manner. The bearings of the crank shaft 4 and 5 and the bearings of the eccentric straps 10 upon the crank eccentrics 11 are lubricated by a pump 13, of any desired construction, which forces the lubricant through ducts 14, 15, 16, 17, and 18, in the shaft and eccentrics, to the respective bearings.

The gaseous refrigerant is returned from the low-side of the evaporator, not shown, by the pipe 19, which, in turn, communicates through the ports 20 to the interior of the upper side of the crank case 6. The gaseous compressed refrigerant leaving the cylinders 7 is discharged through the cylinder head 21 and pipe 22 to the high-side of the evaporator in a manner hereinafter described.

The lubricant forced by the pump 13 to the various bearings of the compressor will exude therefrom, and as the crank and crank eccentrics normally rotate at a high rate of speed when the machine is in operation, the lubricant forced from the bearings and the gaseous refrigerant returned from the low-side of the evaporator through ports 20 will be beaten to a froth so that the lubricant, in settling to the bottom of the crank case, will entrain a certain amount of the gaseous refrigerant. A lubricant sump is provided in the form of a cylindrical casing 23 supported upon the under side of the crank case 6. The sump communicates with the lowermost portion of the crank case 6 by the pipe 24 so that the frothy lubricant with such of the gaseous refrigerant as may be entrained therein will drain from the bottom of the crank case into the sump 23. The pipe 22 leading the compressed refrigerant from the cylinder head 21 is passed longitudinally through the sump casing 23 adjacent the bottom thereof so that the heat of the gaseous refrigerant just compressed will be transmitted to the lubricant in the sump 23, raising the temperature thereof and causing the gaseous refrigerant contained therein to be expelled therefrom. The gaseous refrigerant collecting above the level of the lubricant will pass through pipe 24ª leading from the top of the lubricant sump casing 23 and be discharged through the port 25 adjacent the open end of the cylinders communicating with the upper end of the crank case 6. A lubricant pipe 25ª is connected to the suction side of the pump 13 and to the lowermost side of the lubricant sump casing 23 whereby the action of the pump draws the lubricant freed of the entrained gaseous refrigerant from the sump 23 to the pump 13.

A certain amount of the lubricant will be carried over with the gaseous refrigerant through the pistons 8 and 9 and be discharged with the gaseous refrigerant under compression as it leaves the piston head 21. To remove this lubricant, a lubricant trap 26 is provided on the side of the crank case opposite the low-side admission ports 20. This trap is in the form of a cylindrical casing secured to the crank case 6 and communicates with a passage 27 formed in the contiguous wall of the crank case 6 preferably below the center of the lubricant trap 26. This passage 27 is provided with a float-operated valve 28. The end of the casing 26 opposite the crank case is provided with a closure 29 preferably containing a vertical passageway 30 open at the top to which the pipe 22 is attached and opening at the bottom through port 31 to the bottom of the casing 26. The interior of the casing 26 is provided with a semi-cylindrical concentric baffle 32 between the float 33 of the float-operated valve 28 and the upper wall of the casing 26, which baffle extends from the closure 29 to a point adjacent the crank case 6. The upper side of the casing 26 above the baffle 32 is provided with a port 34 leading to a casing 35 supporting and communicating with a pressure gauge 36 and with a pipe 37 leading the compressed refrigerant to the condenser, not shown, and thence through the liquid receiver and to the evaporator.

Such of the lubricant as is carried over with the compressed gaseous refrigerant passes through pipe 22, through the sump casing 23, and is discharged into the upper end of the passage 30 in the end closure 29 of the lubricant trap. As the passage 30 opens at right angles through port 31 into the lubricant trap, part of the entrained lubricant will be separated out by the blow received at the lower end of the passage 30. The gaseous refrigerant and entrained lubricant entering the lubricant trap will pass upward about the float and receive another blow when striking the baffle 32, which will separate such of the lubricant as is carried over with the refrigerant, and the gaseous refrigerant will then pass about the baffle through passageway 34 and pipe 37 on its way to the evaporator. The level of the lubricant collecting in the bottom of the casing 26 will gradually rise as the lubricant is separated from the gaseous refrigerant, so that after the level has risen above the passage 31, the gaseous refrigerant passing therethrough will bubble up through the collected lubricant and remove still more lubricant from the refrigerant. The float-operated valve is so arranged that the level of the lubricant will be above the passage 27 in the crank case 6 before the float is lifted to open the valve 28 and allow the excess lubricant to return through passage 27 to the crank case and drain therefrom into the lubricant sump 23.

What I claim is:

1. The method of preventing lubricant being delivered with the gaseous refrigerant to the evaporator of a closed compression type of refrigerating apparatus employing a forced lubrication system consisting of expelling the refrigerant from the lubricant entrained in the crank case of the compressor before the refrigerant enters the compression cylinders of the compressor, and removing the lubricant carried over with the refrigerant as it leaves the compressor before the compressed refrigerant enters the evaporator.

2. The method set forth in claim 1, wherein the lubricant expelled and removed from the refrigerant before delivery to the evaporator forms a lubricant supply for the forced lubrication system.

3. In a refrigerating apparatus of the closed compression type, including an evaporator and a compressor having its driving shaft mounted in a closed crank case with said crank case in communication with a conduit leading from the low pressure side of the evaporator and opening into the compression cylinders of the compressor with the opposite ends of the cylinders communicating with a conduit leading to the high pressure side of the evaporator, a lubrication sump communicating with the bottom of the crank case, and exterior means for forcing lubricant from the sump through the compressor, the method of removing the lubricant entrained within the refrigerant before the refrigerant passes into the evaporator, including the expelling of the refrigerant entrained in the lubricant and collected in the sump before entering the compression cylinders by passing the conduit leading to the high side of the evaporator therethrough and removing the lubricant carried over with the compressed refrigerant before it enters the evaporator by providing the conduit after passing through the sump with a pressure-actuated lubricant trap.

WALTER W. WILLIAMS.